United States Patent
Atanssov et al.

(10) Patent No.: US 8,600,189 B2
(45) Date of Patent: Dec. 3, 2013

(54) BLOCK-BASED IMAGE STABILIZATION

(75) Inventors: Kalin Atanssov, San Diego, CA (US); Chinchuan Andrew Chiu, San Diego, CA (US); Hau Hwang, San Diego, CA (US); Hsiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1287 days.

(21) Appl. No.: 11/938,711

(22) Filed: Nov. 12, 2007

(65) Prior Publication Data
US 2009/0123082 A1    May 14, 2009

(51) Int. Cl.
*G06K 9/40* (2006.01)

(52) U.S. Cl.
USPC .................... 382/275; 382/254; 382/264

(58) Field of Classification Search
USPC .................... 382/254, 260, 264, 275
See application file for complete search history.

(56) References Cited

U.S. PATENT DOCUMENTS

| | | | |
|---|---|---|---|
| 5,289,274 A | 2/1994 | Kondo | |
| 6,621,864 B1 * | 9/2003 | Choo | 375/240.16 |
| 2001/0048757 A1 | 12/2001 | Oosawa | |
| 2005/0238101 A1 | 10/2005 | Schu et al. | |
| 2006/0067589 A1 * | 3/2006 | Perlmutter et al. | 382/276 |
| 2006/0072664 A1 * | 4/2006 | Kwon et al. | 375/240.16 |
| 2006/0187324 A1 * | 8/2006 | Lin | 348/241 |
| 2007/0031004 A1 | 2/2007 | Matsui et al. | |
| 2007/0047653 A1 * | 3/2007 | Kim et al. | 375/240.16 |
| 2007/0171981 A1 * | 7/2007 | Qi | 375/240.24 |
| 2007/0248166 A1 | 10/2007 | Chen et al. | |
| 2008/0008361 A1 | 1/2008 | Nozaki et al. | |
| 2008/0144958 A1 * | 6/2008 | Lee | 382/260 |
| 2008/0180535 A1 | 7/2008 | Habuka et al. | |
| 2008/0187234 A1 | 8/2008 | Watanabe et al. | |
| 2009/0052788 A1 | 2/2009 | Doida | |
| 2009/0220173 A1 * | 9/2009 | Wajs | 382/284 |
| 2010/0284626 A1 * | 11/2010 | Malm et al. | 382/261 |

FOREIGN PATENT DOCUMENTS

| | | |
|---|---|---|
| CN | 1680978 A | 10/2005 |
| JP | 62230180 A | 10/1987 |
| JP | 9051537 A | 2/1997 |
| JP | 2002032735 A | 1/2002 |
| JP | 2004343483 A | 12/2004 |
| JP | 2007041752 A | 2/2007 |

(Continued)

OTHER PUBLICATIONS

Ozkan, Mehmet—"Adaptive Motion-Compensated Filtering of Noisy Image Sequences"—IEEE 1993, pp. 277-290.*

(Continued)

*Primary Examiner* — Bernard Krasnic
(74) *Attorney, Agent, or Firm* — James R. Gambale, Jr.

(57) ABSTRACT

To combine two or more images, an image capture device may compute motion vectors for a plurality of blocks of pixels of one of the images. The image capture device may also interpolate or extrapolate motion vectors for individual pixels or sub-blocks of pixels using the block motion vectors. The image capture device may then average the first and second images by averaging each of the pixels of the first image with pixels of the second image that correspond to a location indicated by the plurality of motion vectors. These techniques may reduce blur in image information resulting from certain movements during image capture or the use of certain image capture technologies.

34 Claims, 7 Drawing Sheets

(56) References Cited

FOREIGN PATENT DOCUMENTS

| JP | 2007282119 A | 10/2007 |
|---|---|---|
| KR | 20060135177 A | 12/2006 |
| WO | 2006075394 A1 | 7/2006 |
| WO | 2007032156 A1 | 3/2007 |
| WO | WO2007042073 A1 | 4/2007 |
| WO | WO2007063675 A1 | 6/2007 |

OTHER PUBLICATIONS

Brailean J C et al: "Noise Reduction Filters for Dynamic Image Sequences: A Review" Proceedings of the IEEE, IEEE. New York, US, vol. 83, No. 9, Sep. 1, 1995, pp. 1272-1291, XP000526001 ISSN: 0018-9219 * abstract, pp. 1272-1274, 1278-1279, 1281, 1284, 1286 *.

Byeong-Doo Choi et al: "Overlapped Block Motion Compensation Based on Irregular Grid" Image Processing, 2006 IEEE International Conference on, IEEE, PI, Oct. 1, 2006, pp. 1085-1088, XP031048829 ISBN: 978-1-4244-0480-3 * sections 2 and 3 *.

Dufaux F et al: "Motion Estimation Techniques for Digital TV: A Review and a New Contribution" Proceedings of the IEEE, IEEE. New York, US, vol. 83, No. 6, Jun. 1, 1995, pp. 858-875, XP000518740 ISSN: 0018-9219 * abstract, pp. 863-873 *.

International Search Report and Written Opinion—PCT/US2008/083275, International Search Authority—European Patent Office—Jan. 22, 2009.

Joon-Seek, K. et. al.: "A Fast Feature-Based Block Matching Algorithm Using Integral Projections" IEEE Journal on Selected Areas in 1992 Communications, IEEE Service Center, Piscataway, US, vol. 10, No. 5, Jun. 1, 1992, pp. 968-971, XO000276102 ISSN: 0733-8716.

Marcenaro L et al: "Image stabilization algorithms for video-surveillance applications" Proceedings 2001 International Conference on Image Processing. ICIP 2001. Thessaloniki, Greece, Oct. 7-10, 2001; [International Conference on Image Processing], New York, NY IEEE, US, vol. 1, Oct. 7, 2001, pp. 349-352, XP010564868 ISBN: 978-0-7803-6725-8.

Sullivan G J et al: "Motion compensation for video compression using control grid interpolation" Speech Processing 1. Toronto, May 14-17, 1991; [International Conference on Acoustics, Speech & Signal Processing. ICASSP], New York, IEEE, US, vol. Conf. 16, Apr. 14, 1991, pp. 2713-2716, XP010043566 ISBN: 978-0-7803-0003-3 * sections II-III.

Tekalp et al: "Image Sequences" Wiley Encyclopedia of Electrical. and Electronics Engineering, John Wiley & Sons, Inc, Jan. 1, 1999, pp. 1-43, XP007906504 1-4,6, Inv. 8-11,13, G06T5/50 15-17, G06T5/00 19,21-25 G06T7/20 YISBN: 978-0-471-13946-1 [retrieved on Dec. 27, 1999] * Figs. 6-9,21-23, pp. 9-12, 17, 23-24.

European Search Report—EP08006425—Search Authority—Munich—Dec. 3, 2008.

Taiwan Search Report—TW097143700—TIPO—Nov. 20, 2012.

\* cited by examiner

BLOCK-BASED IMAGE STABILIZATION

TECHNICAL FIELD

The disclosure relates to image processing and, more particularly, techniques for image stabilization in image capture applications

BACKGROUND

As imaging devices become lighter and smaller, images captured by such devices are more susceptible to quality degradation due to inadvertent shaking. In video capture, the shake may result in shaking or jitter in the video image. In still image capture, the shake may result in blurring of the image. Blurring or shaking can make it difficult for the human visual system to focus and concentrate on a region or object of interest within the image. In either case, the quality of the viewing experience of the video or image is reduced.

Image stabilization systems attempt to compensate for inadvertent shaking to produce better image quality. Image stabilization systems generally fall into three main categories: optical image stabilizers (OIS), mechanical image stabilizers (MIS), and electronic image stabilizers (EIS). OIS systems employ an adjustable lens that morphs the image before it reaches the sensor to reduce the effect of motion. MIS systems stabilize the entire camera, e.g., using the center of gravity of the camera, a counterbalance system, and/or the camera operator's body to maintain smooth motion. EIS systems employ signal processing algorithms to alter the captured image.

SUMMARY

This disclosure describes image stabilization techniques for image capture devices, such as wireless communication device that incorporate image capture capabilities, e.g., so-called "camera phones" or "video phones." For example, an image capture device may utilize a block-based image registration technique to reduce the blur of the image. The image capture device may capture two or more images and average the images using the techniques described in this disclosure. The image capture device may, for example, compute motion vectors for a plurality of blocks of pixels of one of the images. In some aspects, the image capture device may interpolate or extrapolate motion vectors for individual pixels or sub-blocks of pixels using the block motion vectors.

The image capture device may then average the first and second images by averaging each of the pixels of the first image with pixels of the second image that correspond to a location indicated by the plurality of motion vectors. Using multiple motion vectors for adjusting the pixels results in a better representation of the image when movement causes portions of the image to move in different directions. Examples of such movement include rotation tangential to the camera-scene line of sight, movement toward or away from the scene, or any combination of these movements. The image capture device may average portions, e.g., blocks or sub-blocks, of the image using a motion vector representative of the motion of that particular portion of the image instead of motion of the image as a whole. In some cases, image registration may be even more accurate by accounting for movement on a pixel-by-pixel basis.

In one aspect, a method for processing digital image data comprises partitioning a first image of a scene of interest into a plurality of blocks of pixels, computing, for each of the plurality of blocks, a motion vector that represents the offset between the block of the first image and a corresponding block of pixels within a second image of the scene of interest, averaging pixel values for each of the pixels of the blocks of the first image with pixel values of corresponding pixels of the second image based on the motion vector of the respective block to which the pixels belong, and storing the averaged pixel values.

In another aspect, a computer-program product for processing digital image data comprises a computer readable medium having instructions thereon. The instructions comprise code for partitioning a first image of a scene of interest into a plurality of blocks of pixels, code for computing, for each of the plurality of blocks, a motion vector that represents the offset between the block of the first image and a corresponding block of pixels within a second image of the scene of interest, code for averaging pixel values for each of the pixels of the blocks of the first image with pixel values of corresponding pixels of the second image based on the motion vector of the respective block to which the pixels belong and code for storing the averaged pixel values.

In another aspect, an apparatus for processing digital image data comprises an image processor to process the image data, the image processor including a block partitioner to partition a first image of a scene of interest into a plurality of blocks of pixels, a motion vector module that computes, for each of the plurality of blocks, a motion vector that represents the offset between the block of the first image and a corresponding block of pixels within a second image of the scene of interest, and pixel averaging module that averages pixel values for each of the pixels of the blocks of the first image with pixel values of corresponding pixels of the second image based on the motion vector of the respective block to which the pixels belong. The apparatus also comprise a memory to store the averaged pixel values.

In another aspect, an apparatus for processing digital image data comprises means for partitioning a first image of a scene of interest into a plurality of blocks of pixels, means for computing, for each of the plurality of blocks, a motion vector that represents the offset between the block of the first image and a corresponding block of pixels within a second image of the scene of interest, means for averaging pixel values for each of the pixels of the blocks of the first image with pixel values of corresponding pixels of the second image based on the motion vector of the respective block to which the pixels belong, and means for storing the averaged pixel values.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other

DETAILED DESCRIPTION

Figure 1:
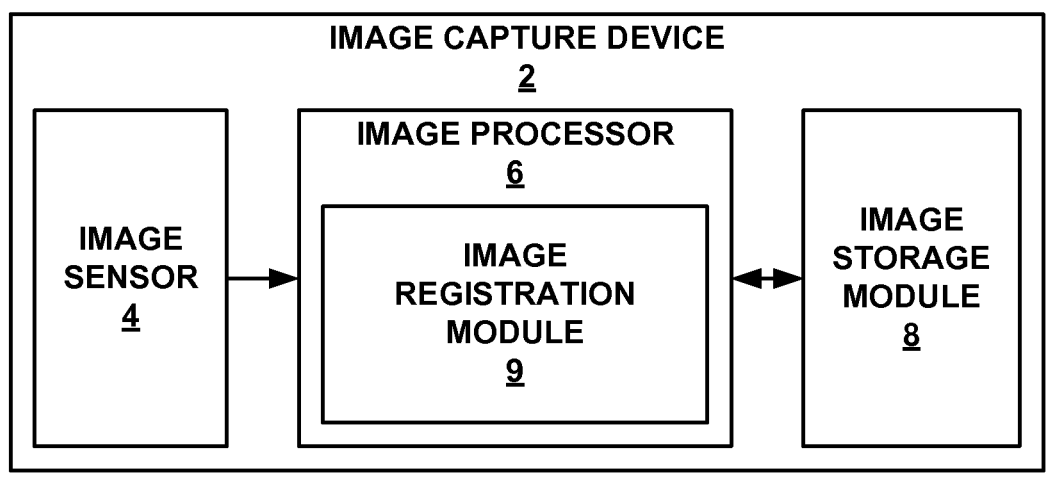
FIG. 1 is a block diagram illustrating an example image capture device that implements image stabilization techniques.

Image capture devices, especially those that are small and lightweight, such as a so-called camera phone, are susceptible to undesirable movements by a user of the device during image capture. Such undesirable movements generally result in a reduced image quality due to blurring or other visual artifacts. To compensate for the movements, the image capture device may provide image stabilization using the image registration techniques described in this disclosure. In general, image registration refers to a technique in which two or more frames, e.g., consecutive frames, are captured with a reduced exposure time, aligned and then averaged together. Image registration may result in reduced blur due to the shortened exposure time and reduced noise due to averaging of the two or more frames.

In accordance with the techniques described in this disclosure, an image capture device may utilize a block-based image registration technique to reduce the blur of the image. The image capture device may capture two or more images of the same scene of interest and average the images using the techniques described in this disclosure. The image capture device may, for example, compute motion vectors for a plurality of blocks of pixels of one of the images. In some aspects, the image capture device may interpolate or extrapolate motion vectors for individual pixels or sub-blocks of pixels using the block motion vectors. The motion vectors represent the offset between the block, sub-block or pixel of the first image and a corresponding block, sub-block or pixel within the second image.

The image capture device may then average the first and second images by averaging each of the pixels of the first image with pixels of the second image that correspond to a location indicated by the plurality of motion vectors. The image capture device may use straight averaging of the first and second images, a weighted average of the first and second images, a sum of the first and second images or other technique for combining the image information of the two or more images. Using multiple motion vectors for adjusting the pixels results in a better representation of the image when movement, such as rotation tangential to the camera-scene line of sight or movement toward or away from the scene, causes portions of the image to move in different directions. In particular, portions (e.g., blocks or sub-blocks) of the image are averaged using a motion vector representative of the motion of that particular portion of the image instead of motion of the image as a whole. In some cases, image registration may be even more accurate by accounting for movement on a pixel-by-pixel basis.

These techniques may be particularly effective in reducing blur or other visual artifacts of an image that occur as a result of undesirable camera movement, such as translational motion, rotation tangential to the camera-scene line of sight, movement toward or away from the scene, or any combination of these movements during image capture. Moreover, these techniques may be effective in reducing blur or other visual artifacts of the image that occur as a result of the use of certain image capturing technologies that utilize "rolling shutters," such as a complementary metal-oxide-semiconductor (CMOS) image sensor technology.

FIG. 1 is a block diagram of an example image capture device 2 that implements the image stabilization techniques described in this disclosure. Image capture device 2 may be a digital camera, such as a digital still image camera, a digital video camera or a combination of both. In addition, image capture device 2 may be a stand-alone device, such as a stand-alone camera, or be integrated in another device, such as a wireless communication device. As an example, image capture device 2 may be integrated in a mobile telephone to form a so-called camera phone or video phone. Although the techniques described in this disclosure may be generally applicable to captured digital video, application of such techniques to digital still images will be described for purposes of illustration.

As shown in FIG. 1, image capture device 2 includes an image sensor 4, an image processor 6, and an image storage module 8. Image sensor 4 acquires image information for a scene of interest. For example, image sensor 4 may capture still images, or possibly full motion video sequences, in which case image processing may be performed on one or more image frames of the video sequence. Captured video may be support general video capture for archival or video telephony or other applications. Image sensor 4 may include a two-dimensional array of individual image sensor elements, e.g., arranged in rows and columns. In some aspects, each of the image sensor elements of image sensor 4 may be associated with a single pixel. In other words, there may be a one-to-one correspondence between image sensor elements and pixels. Alternatively, there may be more than one image sensor element associated with each pixel or more than one pixel associated with each image sensor element. Image sensor 4 may comprise, for example, an array of solid state sensors such as complementary metal-oxide semiconductor (CMOS) sensors, charge coupled device (CCD) sensors or the like. Moreover, image sensor 4 may maintain one or more image buffers to which it stores image information for the captured images.

To capture the image, image sensor 4 exposes the image sensor elements to the image scene to capture the image. The image sensor elements within image sensor 4 may, for example, capture intensity values representing the intensity of the light of the scene at a particular pixel position. In some cases, each of the image sensor elements of sensor 4 may only be sensitive to one color, or color band, due to the color filters covering the sensors. For example, image sensor 4 may comprise, for example, an array of red, green and blue filters. Image sensor 4 may utilize other color filters, however, such as CMYK color filters. Thus, each of the image sensors of image sensor 4 may capture intensity values for only one color. Thus, the image information may include pixel intensity and/or color values captured by the sensor elements of image sensor 4.

Image processor 6 receives the image information for two or more images (or frames), e.g., from buffers of image sensor 4, and performs the image stabilization techniques described in this disclosure. In particular, image processor 6 includes an image registration module 9 that performs block-based image registration. Image registration module 9 partitions one or both of the images into a plurality of blocks of pixels (referred to in this disclosure as "blocks"). These blocks, sometimes referred to as "macroblocks," typically represents a contiguous portion of the image information. Image registration module 9 may further sub-partition each block into two or more sub-blocks. As an example, a 16×16 block may comprise four 8×8 sub-blocks, eight 4×8 sub-blocks or other sub-partition blocks. Blocks of larger or smaller dimensions are also possible. As used herein, the term "block" may refer to either any size block or a sub-block.

Image registration module 9 computes motion vectors for each of the blocks. The motion vectors of the blocks represent the displacement of the identified block between the first image and the second image. Thus, the motion vectors represent an offset between the block in the first image and a corresponding block within the second image. The offset may be due to shaking or other unintentional device movement, or use of certain image capturing technologies. In one aspect, image registration module 9 may register each pixel of the image by averaging the pixel values of pixels of the first image with pixel values of corresponding pixels of the second image located using the block motion vectors. In other words, image registration module 9 may, for each of the blocks, use the motion vector of the block for each of the pixels of the block. Each block has a different motion vector, however, resulting in the use of a plurality of motion vectors to compensate for any unwanted motion. Using multiple motion vectors for adjusting the pixels results in a better representation of the image when movement, such as rotation tangential to the camera-scene line of sight, or movement toward or away from the scene, causes portions of the image to move in different directions.

In other aspects, however, image registration module 9 may use the motion vectors associated with two or more of the blocks to estimate motion vectors for one or more sub-blocks, where a sub-block may comprise a contiguous portion of a block. A sub-block, for example, may comprise a 4×4 contiguous square pixel portion of an 8×8 contiguous square pixel block. In one aspect, image registration module 9 may use the motion vectors associated with the blocks to estimate motion vectors for each of the pixels of the blocks, and in this instance, a sub-block comprises a single pixel of a block. Using the motion vectors determined for each of the blocks, sub-blocks and/or pixels, image registration module 9 averages the pixel values of pixels of the first image with pixel values of corresponding pixels of the second image to register the image. For example, image registration module 9 may average the pixel values, e.g., intensity and/or color values, of pixels of the most recently captured image with the pixel values of pixels of a temporally prior image. Image registration module 9 may use a straight average of the first and second images, a weighted average of the first and second images, a sum of the first and second images or other techniques for combining the image information of the two or more images. Image registration module 9 may store the averaged pixel values at the pixel location of the most recently captured image. In this manner, image registration module 9 may replace the pixel values of the pixels of one of the captured images with the averaged pixel values during image registration. This averaged image information (i.e., pixel values) typically exhibits less blur, thus providing enhanced image quality, especially in instances where the above mentioned movements occur and/or image capturing technologies are involved. In this manner, image registration may be even more accurate by accounting for movement on a block-by-block, a sub-block by sub-block or a pixel-by-pixel basis. Moreover, computing resources are reserved by performing motion estimation at a block level and estimating motion vectors for the pixel level.

Image processor 6 may be realized by one or more microprocessors, digital signal processors (DSPs), application specific integrated circuits (ASICs), field programmable gate arrays (FPGAs), or any other equivalent discrete or integrated logic circuitry, or a combination thereof. In some embodiments, image processor 6 may form part of an encoder-decoder (CODEC) that encodes the image information according to a particular encoding technique or format, such as Motion Pictures Expert Group (MPEG)-2, MPEG-4, International Telecommunication Union (ITU) H.263, ITU H.264, Joint Photographic Experts Group (JPEG), Graphics Interchange Format (GIF), Tagged Image File Format (TIFF) or the like. Image processor 6 may perform additional processing on the image information, such as image cropping, compression, enhancement and the like.

Image processor 6 stores the registered image in image storage module 8. Alternatively, image processor 6 may perform additional processing on the registered image and store the registered image information in processed or encoded formats in image storage module 8. If the registered image information is accompanied by audio information, the audio also may be stored in image storage module 8, either independently or in conjunction with the video information comprising one or more frames containing the registered image information. Image storage module 8 may comprise any volatile or non-volatile memory or storage device, such as read-only memory (ROM), electrically erasable programmable read-only memory (EEPROM), or FLASH memory, or such as a magnetic data storage device or optical data storage device.

A number of other elements may also be included in image capture device 2, but are not specifically illustrated in FIG. 1 for simplicity and ease of illustration. For example, image capture device 2 may include additional components for capturing images, such as a lens, a shutter, a flash device and a display. The architecture illustrated in FIG. 1 is merely exemplary, as the techniques described in this disclosure may be implemented with a variety of other architectures. Moreover, the features illustrated in FIG. 1 may be realized by any suitable combination of hardware and/or software components.

Figure 2:
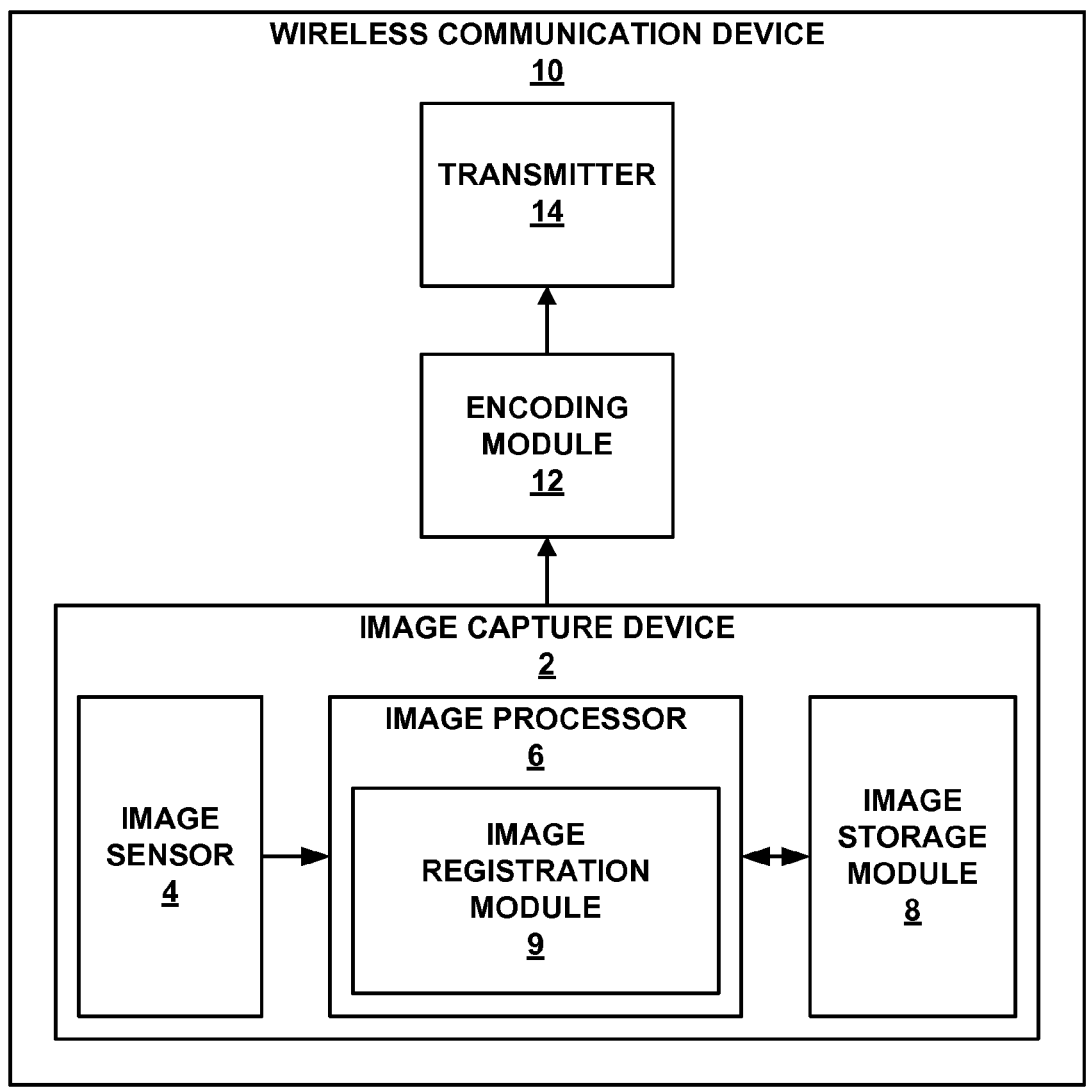
FIG. 2 is a block diagram of a wireless communication device that incorporates the image capture device of FIG. 1.

FIG. 2 is a block diagram illustrating an example wireless communication device 10 that includes an image capture device 2 that implements the image stabilization techniques described in this disclosure. In other words, FIG. 2 shows image capture device 2 integrated within a wireless communication device. Operation of image capture device 2 is described above with respect to FIG. 1 and therefore will not be described in detail here. Wireless communication device 10 may comprise a wireless communication device handset, such as a cellular phone having image capturing capabilities (e.g., the so-called camera phone or video phone), a video recorder, a personal digital assistant (PDA), a laptop computer or any other handheld device having image capturing and wireless communication capabilities. Although illustrated in the context of a wireless communication device, the techniques of this disclosure may be applicable to wired communication devices.

In the example of FIG. 2, wireless communication device 10 includes image capture device 2, an encoding module 12 and a transmitter 14. Encoding module 12 may encode the captured image information to compress the image into a particular image compression format for storage and/or transmission. Encoding module 12 may compress the image using any of a number of image compression formats, including JPEG, TIFF, GIF or other image compression format. In the case of video, encoding module 12 may compress the video using any number of video compression formats, such as MPEG, MPEG Advanced Video Coding (AVC) part 10, ITU H.264 and the like.

Wireless communication device 10 may transmit the encoded image to another device via transmitter 14. Transmitter 14 typically provides an interface to a cellular network, such as a code division multiple access (CDMA) network, a wideband code division multiple access (W-CDMA) network, a time division multiple access (TDMA) network, and a global system for mobile communication (GSM) network, or other similar network. Transmitter 14, in addition or as alternate to the cellular network, may provide an interface to a wireless network as defined by any of the relevant Institute of Electrical and Electronics Engineers (IEEE) 802.11 standards, or any other wired or wireless network. Although described as including only image capture device 2, encoding module 12 and transmitter 14, wireless communication device 10 may include other modules, such as a display, a user interface (e.g., a keypad) for interfacing with a user, one or more processors for performing additional operations, and various ports and receptacles for accepting removable memory, headphones, power supplies, and any other such peripherals.

Figure 3:
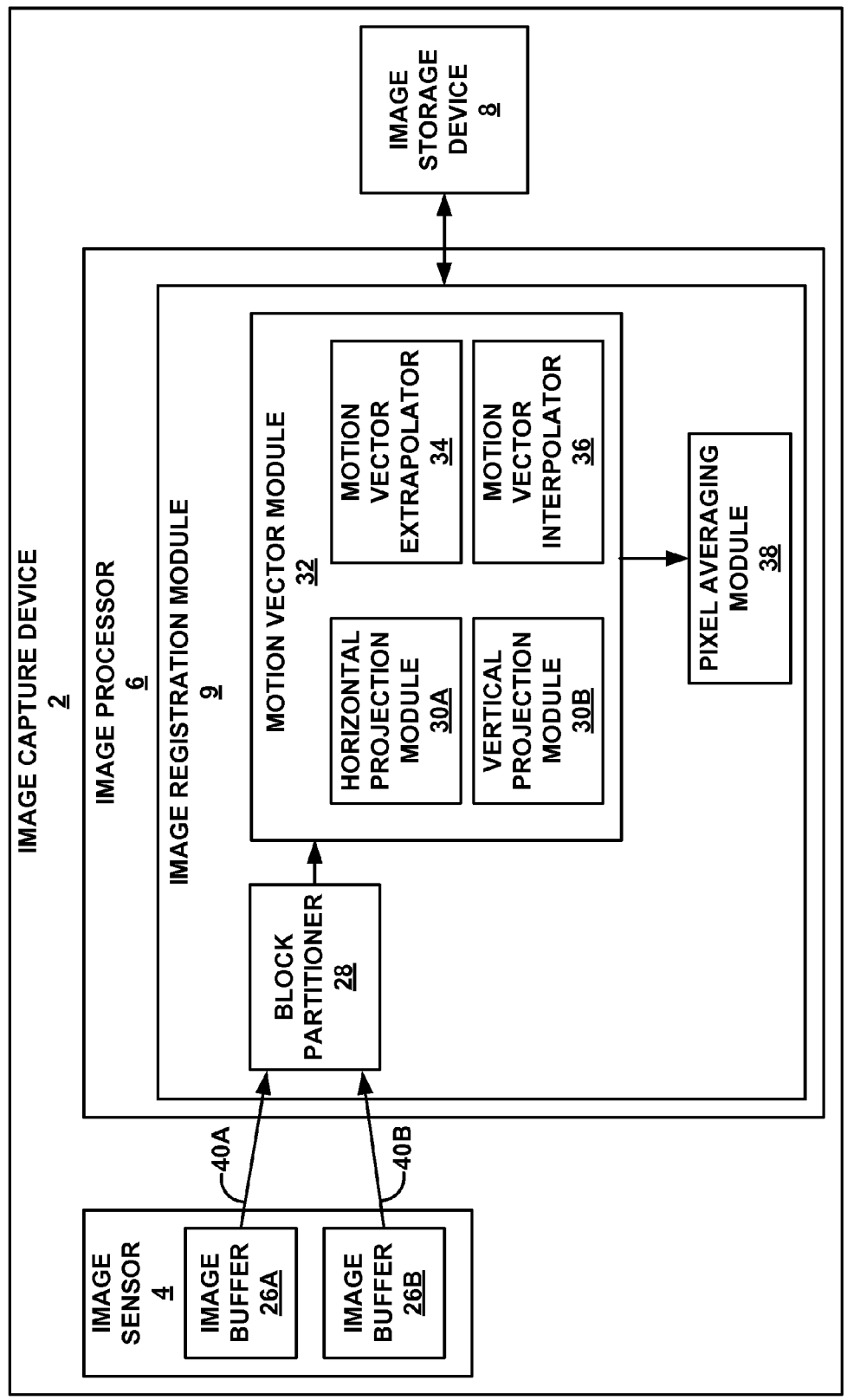
FIG. 3 is a block diagram illustrating the image capture device of FIG. 1 in further detail.

FIG. 3 is a block diagram illustrating image capture device 2 of FIG. 1 in further detail. As illustrated in FIG. 3, image sensor 4 includes image buffers 26A and 26B ("image buffers 26") both of which may store image information pertaining to the same scene of interest. Image sensor 4 may, for example, store the image information in image buffers 26 during an image preview. More specifically, image sensor 4 may store the image information in image buffers 26 while the user is pointing the image capture device at the scene of interest, but before the user actuates a button to capture the image. In some embodiments, image buffers 26 store image information captured within seconds if not milliseconds or shorter time periods of one another, thereby ensuring that each of buffers 26 stores successive sets of image information pertaining to the same scene of interest. This successive image buffering technique is utilized to facilitate blur reduction and occurs unnoticed by a user attempting to capture the image. That is, from the user's perspective, only a single image is captured via activation of a button of image capture device 2. However, two or more images are actually captured and averaged to generate the single image viewed by the user. Although FIG. 3 includes two image buffers, image capture device 2 may include more than two image buffers 26. In this manner, the image stabilization techniques described in this disclosure may, by extension, be applied to more than two images.

Buffers 26 may comprise any volatile or non-volatile memory or storage device, such as read-only memory (ROM), electrically erasable programmable read-only memory (EEPROM), or FLASH memory, or such as a magnetic data storage device or optical data storage device. While shown in FIG. 3 as residing within image sensor 4, buffers 26 may reside external to image sensor 4, such as within other modules of image capture device 2 including image processor 6, image storage module 8, or image registration module 9.

Block adaptive image registration module 9 includes a block partitioner 28, a motion vector module 32, and a pixel averaging module 38. Motion vector module 32 includes respective horizontal and vertical projection modules 30A and 30B ("projection modules 30"), a motion vector extrapolator 34, and a motion vector interpolator 36. Depiction of different features as units or modules is intended to highlight different functional aspects of image registration module 9, and does not necessarily imply that such units or modules must be realized by separate hardware, software and/or firmware components. Rather, functionality associated with one or more units or modules may be integrated within common hardware, software components and/or firmware components.

As described above, image sensor 4 captures images 40A and 40B ("images 40") and stores images 40 to buffers 26. Image registration module 9 receives the images from buffers 26 and employs block partitioner 28 to partition one or both of the images 40 into two or more blocks of pixels. In the case of the JPEG standard, for example, block partitioner 28 may partition each of the images into 8×8 blocks that include eight rows of pixels and eight columns of pixels. Blocks of larger or smaller than eight rows or columns are also possible. For example, block partitioner 28 may partition each of the images into 16×16 blocks, 8×16 blocks, 16×8 blocks or blocks of any size.

Figure 5A:
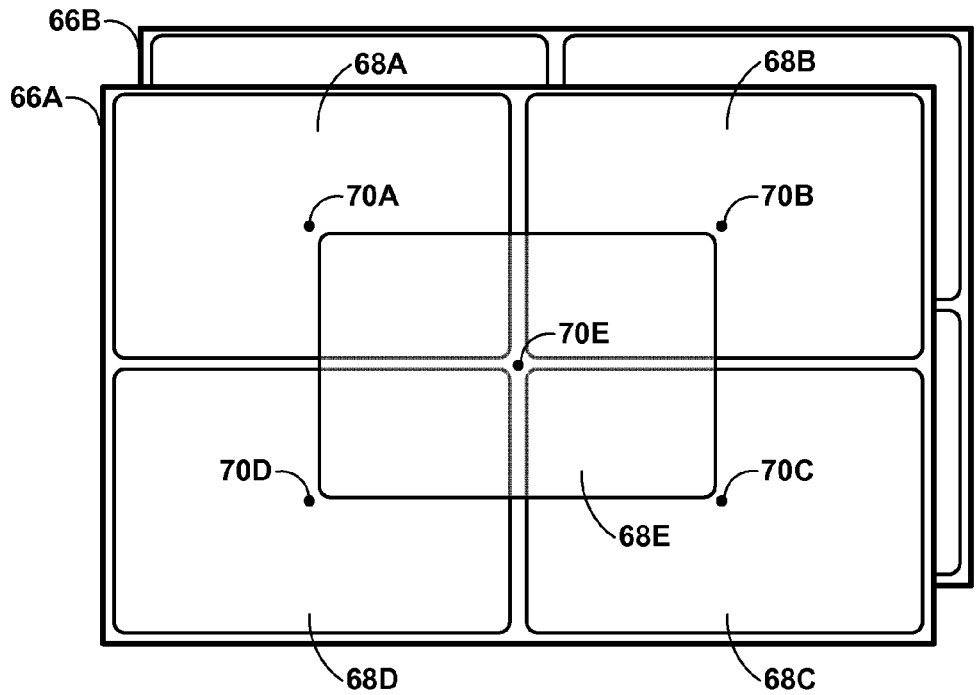
FIGS. 5A-5E are diagrams illustrating exemplary image information captured and stored by an image capture device and processed by an image processor according to the image stabilization techniques as described in this disclosure.
Figure 5B:
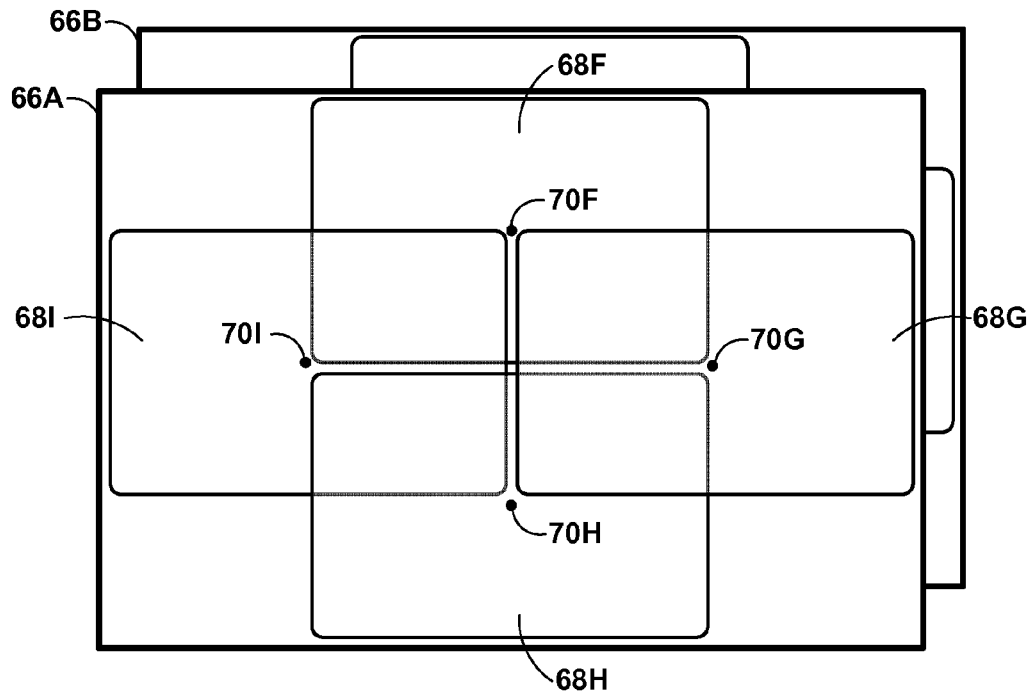

When block partioner 28 partitions both of the images, the images are typically partitioned in the same manner. That is, block partitioner 28 may partition each of the images into the same block configuration, such as the block configurations shown in FIGS. 5A and 5B. As is further shown in FIGS. 5A and 5B, block partitioner 28 may partition the images into a number of overlapping blocks. Blocks are "overlapping" when a first block of the image, for example, defines a first contiguous area of the captured image, and a second block of the image defines a second contiguous area of the captured image, where the first contiguous area contains at least some of the second contiguous area. In other aspects, block partitioner 28 may partition each of the images into non-overlapping blocks.

Motion vector module 32 computes motion vectors for each of the blocks. In one aspect, motion vector module 32 may compute the motion vectors for each of the blocks using horizontal projections, vertical projections or both. Horizontal projections are summations of the pixel values of a row of pixels of a block. Vertical projections are summations of the pixel values of a column of pixels of a block. For example, motion vector module 32 may determine, for each of the blocks of each image, horizontal and vertical projections according to the following equations:

$$P_H(j) = \sum_i Im(i, j), \quad (1)$$

$$P_V(i) = \sum_j Im(i, j) \quad (2)$$

where $P_H(j)$ denotes the horizontal projection as a function of pixels j along the y-axis, $P_V(i)$ denotes the vertical projection as a function of pixels "i" along the x-axis, and $Im(i, j)$ denotes the image information as a function of the pixels "i" and "j." $P_H$ therefore is the summation ($\Sigma$) of the x-axis pixel values (as i varies and j remains static) of image information of the particular block. In this manner, motion vector module 32 generates a single-dimensional horizontal projection vector from two-dimensional image information of the block. Thus, motion vector module 32 may generate a one-dimensional, sixteen element horizontal projection vector that represents the two-dimensional 8×8 block. Likewise, $P_V$ is the summation (Σ) of the y-axis pixel values (as i remains static and j varies) of image information of the block, i.e., Im(i, j), to form a single-dimensional vertical projection vector from two-dimensional image information of the same block for which the horizontal projection was determined. Each block undergoes the same procedure until every block has been reduced to a series of horizontal and vertical projections.

After determining the horizontal and vertical projection vectors according to respective equations (1), (2) above or any other projection-like function capable of compressing two-dimensional image information of the block into a single dimension, motion vector module 32 computes motion vectors for the blocks as a function of the projection vectors. In one embodiment, motion vector module 32 computes the motion vectors according to the following equations:

$$V_H = j \to \min_j \sum_i (P1_H(i) - P2_H(i+j))^2, \quad (3)$$

$$V_V = \to \min_j \sum_i (P1_V(i) - P2_V(i+j))^2 \quad (4)$$

where $V_H$ denotes the horizontal motion vector component, $V_V$ denotes the vertical motion vector component, $P1_H$ denotes the horizontal projection for the particular block of the first image, $P2_H$ denotes the horizontal projection for the corresponding block of the second image, and $P1_V$ and $P2_V$ denote vertical projections of respective first and second images. In effect, equations (3) and (4) calculate $V_H$ and $V_V$ by determining the mean squared differences between respective horizontal and vertical projections determined from corresponding blocks of the first and second images. Corresponding blocks can be any two or more of the blocks, each block being a partition from a different image, that define the same contiguous area within their respective image. After calculating these motion vector components, motion vector module 32 determines the motion vectors by combining the horizontal and vertical motion vector components relating to the same block. Thus, each motion vector represents the offset between the block of the first image and a corresponding block of pixels within the second image. Although described above as using means squared differences, other techniques may be used to compute the motion vectors, such as max correlation/covariance, sum of absolute differences, or the like.

Motion vector module 32 may compute the motion vectors using other motion estimation techniques. For example, motion vector module 32 may, for each block of the first image, search the second frame for a block that is a best match to the respective block of the first image. Motion vector module 32 may compare the two-dimensional block information of the blocks of the first image with two-dimensional block information of the blocks in the second image using an error measure, e.g., sum of absolute difference (SAD), mean square error (MSE) or the like. Motion vector module 32 may select the block with the smallest error measurement. The computation of motion estimation using two-dimensional block data may, however, require more processing resources and time.

In some aspects, motion vector module 32 may determine motion vectors for other pixels of the blocks using the motion vectors computed for the blocks. Motion vector module 32 may, for example, include a motion vector extrapolator 34 and a motion vector interpolator 36 to compute motion vectors for other pixels of the blocks using the block motion vectors according to any of a number of extrapolation and interpolation techniques as will be described in more detail. Motion vector extrapolator 34 may, for example, use linear extrapolation, polynomial extrapolation or conic extrapolation to compute the motion vectors of at least a portion of the other pixels of the block. Likewise, motion vector interpolator 36 may, for example, use linear interpolation, polynomial interpolation or spline interpolation to compute the motion vectors of at least a portion of the other pixels of the block. In this manner, motion vector module 32 fits a line or curve to the computed motion vectors to extrapolate or interpolate the motion vectors for the pixels. Based on these fitted lines or curves, motion vector extrapolator 34 or interpolator 36 determines a motion vector for pixel of one of the images. As described above, the motion vectors represent the offset between the pixel of the first image and a corresponding pixel within the second image. Although described in this disclosure as determining motion vectors for each of the pixels of the blocks, motion vector module 32 may extrapolate or interpolate motion vectors for only a subset of the pixels, e.g., sub-blocks of pixels. For example, if the original block is an 8×8 block, motion vector module 32 may extrapolate or interpolate motion vectors for four 2×2 sub-blocks Pixel averaging module 38 computes the pixel values for the registered image using the pixel values from both of the images. In particular, pixel averaging module 38 averages pixel values, e.g., intensity and/or color values, for pixels of the first frame with pixel values, e.g., intensity and/or color values, of corresponding pixels of the second frame located at locations indicated by the motion vectors (i.e., offsets). In one aspect, pixel averaging module 38 may perform the pixel averaging using motion vectors associated with the individual pixels, e.g., determined using extrapolation or interpolation. In other aspects, pixels averaging module 38 may perform pixel averaging using motion vectors associated with the blocks, i.e., the motion vector associated with the block is used for identifying the corresponding pixels in the second image. By capturing an image using the image registration techniques described above, image registration module may reduce the amount of blur that occurs due to any of a number of unintentional camera movements.

The functionality as described in this disclosure and ascribed to image registration module 9 may be performed by a programmable processor that executes instructions stored to a computer-readable medium, where the instructions and/or code cause the processor to perform image registration as described in this disclosure. In some cases, the computer-readable medium may form part of a computer program product, which may be sold to manufacturers and/or used in a device. Alternatively, the techniques described in this disclosure and ascribed to image registration module 9 may be implemented generally in hardware and particularly within an integrated circuit. The integrated circuit comprises at least one processor configured to perform the functionality described in this disclosure.

Figure 4:
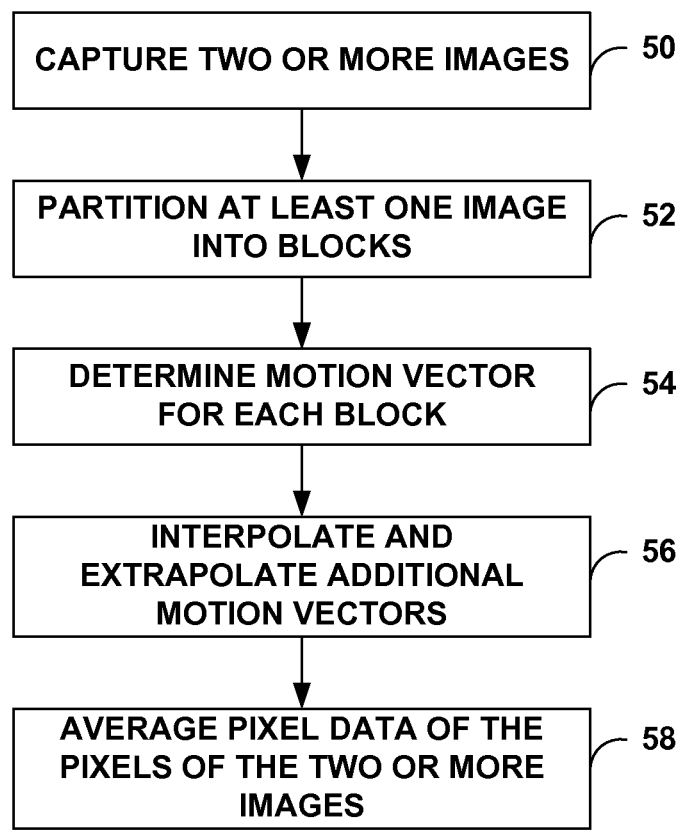
FIG. 4 is a flowchart illustrating example operation of an image capture device performing image stabilization in accordance with the techniques described in this disclosure.

FIG. 4 is a flow diagram illustrating example operation of an image capture device, such as image capture device 2 of FIG. 3, performing the image stabilization technique described in this disclosure. Initially, image sensor 4 of image capture device 2 captures two or more images and stores the images to buffers 26 (50). As described above, the two or more images may be successive images that are captured by image sensor 4 milliseconds, or even shorter time periods, from one another. For example, the successive images may be captured during an image preview. Block partitioner 28 partitions at least one of the images into a plurality of blocks (52). The blocks may be overlapping or non-overlapping, and may be of varying dimensions.

Motion vector module 32 computes motion vectors for each of the blocks of at least one of the images (54). In one embodiment, motion vector module 32 may compute motion vectors for each of the blocks of at least one of the images based on one or more projections, e.g., either a horizontal projection, a vertical projection or both. In particular, motion vector module 32 may determine the motion vectors for the one or both of the images according to equations (3) and (4). Motion vector module 32 may, however, compute the motion vectors using other motion estimation techniques.

Motion vector module 32 interpolates and/or extrapolates motion vectors for at least a portion of the other pixels of the block using two or more of the computed motion vectors of the block (56). Motion vector module 32 may, for example, fit a line in the case of linear interpolation and/or extrapolation or a curve in the case of higher order interpolation and/or extrapolation that passes through the computed motion vectors, and estimate a motion vector, e.g., an offset, for at least a portion of the other pixels of one of the images using the fitted line or curve. As described in detail above, motion vector module 32 may extrapolate or interpolate motion vectors for each of the pixels of the block or, alternatively, for sub-blocks of pixels of the block.

Pixel averaging module 38 computes, for at least a portion of the pixel locations of the block, the pixel values for the registered image using the pixel information from both of the images (58). In particular, pixel averaging module 38 obtains the pixel information from pixels of the first image and pixel information from corresponding pixels of the second image located at a location indicated by the motion vector (i.e., offset), and averages the pixel information to generate the registered image. Pixel averaging module 38 may use a straight average of the first and second images, a weighted average of the first and second images, a sum of the first and second images or other techniques for combining the image information of the two or more images. By capturing an image using the image registration techniques described above, image registration module may reduce the amount of blur that occurs due to any of a number of unintentional camera movements.

FIGS. 5A-5E are illustrations of example images 66A and 66B ("images 66") captured and stored by an image capture device, such as image capture device 2 of FIG. 3, and processed by image processor 6 according to the image stabilization techniques described in this disclosure. In particular, image sensor 4 may capture images 66 and store images 66 in respective ones of buffers 26. Although image information 66 is shown as two images, for ease of illustration purposes most of the discussion below will be directed to image 66A. However, the discussion is equally applicable to image 66B.

Block partitioner 28 partitions one or both of images 66 into two or more blocks of pixels. As shown in reference to image 66A of FIGS. 5A and 5B, block partitioner 28 partitions image information into blocks 68A-68I ("blocks 68"). In the example illustrated in FIGS. 5A and 5B, blocks 68 are a plurality of overlapping blocks. However, the techniques may be applied to block partitions that are not overlapping. Although the partition of image 66A into blocks 68 is illustrated in two separate figures, blocks 68 are partitions of a single image 66A. In other words, image 66A is partitioned into nine blocks. For example, block 68F of FIG. 5B overlaps blocks 68I and 68G of FIG. 5B as well as blocks 68A, 68B and 68E of FIG. 5A. Likewise, block 68E overlaps blocks 68A-68D of FIG. 5A and blocks 68F-68I of FIG. 5B. Block partitioner 28 may, in some cases, partition image 66B in a similar fashion.

Block partitioner 28 may select this partitioning scheme to enable the blur reduction for the certain movements described above as well as to decrease computation complexity. For example, by selecting to partition image information 66A into nine blocks, block pardoner 28 may more easily detect and correct for blur caused by rotation tangential to the camera-scene line of sight, movement toward or away from the scene, in addition to horizontal and vertical (translational) movement. Moreover, the block partitioning scheme may further enable reduction of blur or other visual artifacts of the image that occur as a result of movement in conjunction with image capturing technologies that utilize rolling shutters. Image registration module 9 may be able to detect such motions because of the scattered nature of the block centers 70A-I.

Figure 5C:
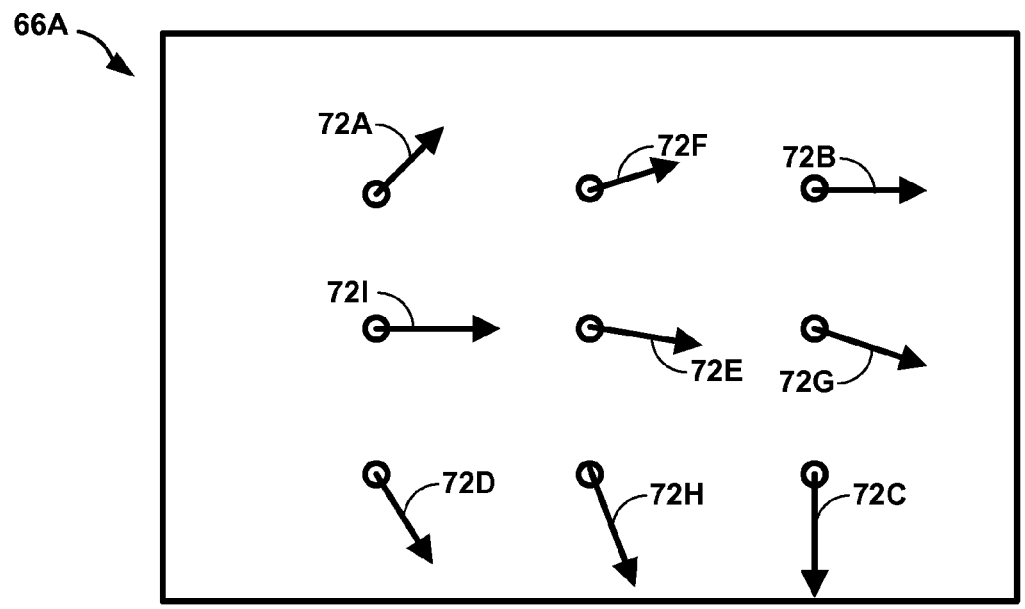

Motion vector module 32 determines motion vectors 72A-72I ("motion vectors 72") for the respective blocks 68, as shown in FIG. 5C. Motion vector module 32 may calculate motion vectors 72 for each of blocks 68 using any of a number of techniques as described above. In the example illustrated in FIG. 5C the motion vectors for the respective blocks form a 3×3 motion grid. As described above, however, the techniques are applicable to any grid that is 2×2 or larger.

Figure 5D:
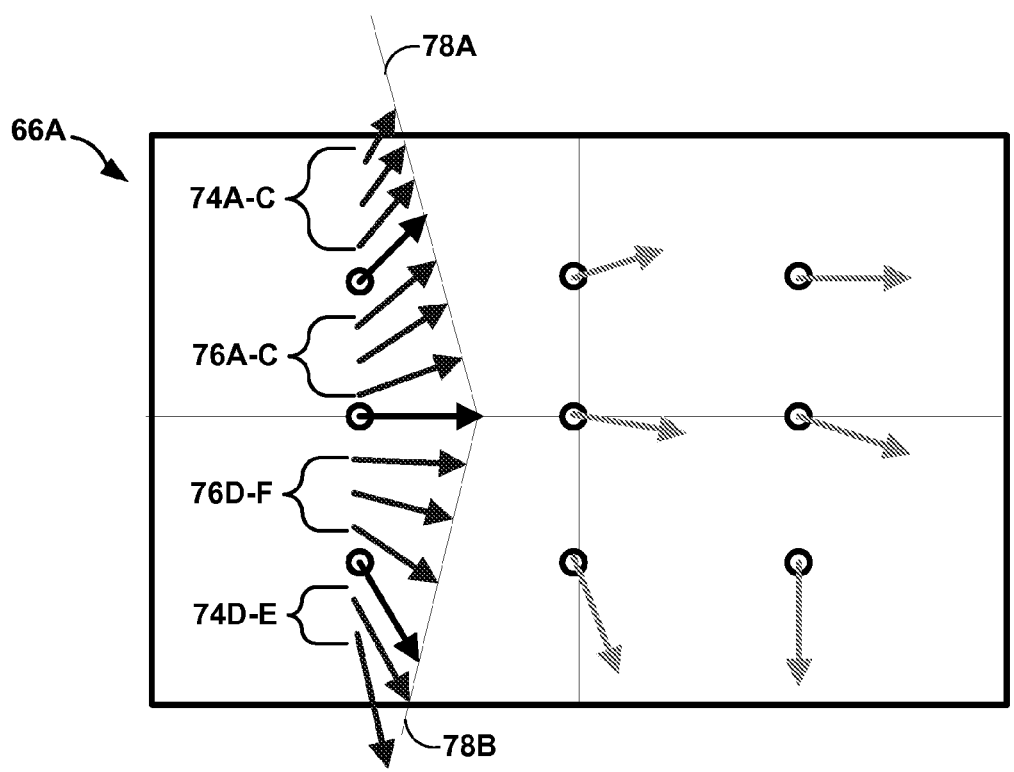
Figure 5E:
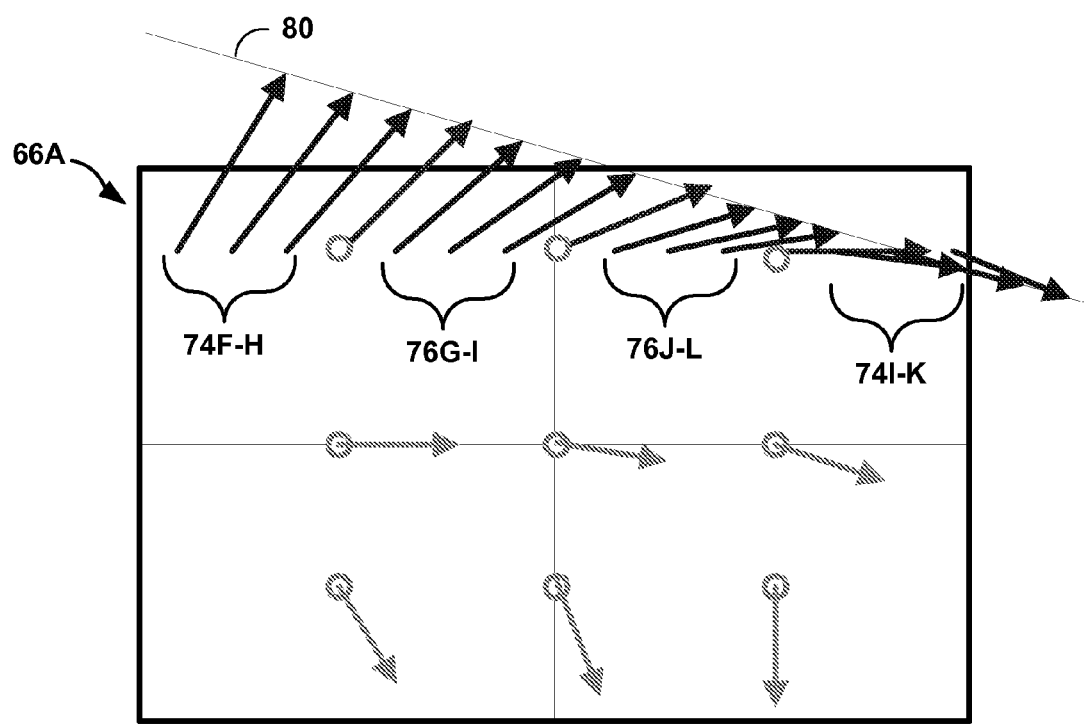

Once motion vectors 72 are determined, motion vector extrapolator 34 and interpolator 36 respectively extrapolate and interpolate motion vectors 74A-74K and 76A-76L shown in FIGS. 5D and 5E based on motion vectors 72 according to conventional extrapolation and interpolation techniques. For ease of illustration, only a subset of extrapolated and interpolated motion vectors 74 and 76 are shown. Extrapolated and interpolated motion vectors 74 and 76 may be calculated for each row and column of pixels within image 66. In other words, motion vector module 32 may compute motion vectors for each of the pixels within each of the blocks. As described above, however, the techniques may be used to compute motion vectors for only a subset of the pixels of the blocks, e.g., sub-blocks. The invention therefore should not be limited to the illustration of motion vectors 72-76 as shown in FIGS. 5D and 5E.

In the example illustrated in FIGS. 5D and 5E, motion vector extrapolator 34 and interpolator 36 use linear interpolation and extrapolation by fitting lines 78A and 78B to the vertical motion vectors (FIG. 5D) and line 80 to the horizontal motion vectors (FIG. 5E). As described above, however, higher order interpolation or extrapolation techniques may be used to compute the motion vectors for the individual pixels. Thus, lines may be fit according to a quadratic equation, splines, or any other type of line fitting algorithm.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various techniques have been described. These and other example aspects are within the scope of the following claims.

The invention claimed is:

1. A method for stabilizing digital images comprising:
   partitioning a first image of a scene of interest into a plurality of blocks of pixels, wherein four non-overlapping blocks of the plurality of blocks each define a unique quadrant of the first image, each unique quadrant comprising substantially one quarter of the first image and wherein the first image is partitioned with a fifth block that overlaps only a portion of each of the four non-overlapping blocks;
   computing, for each of the plurality of blocks, a motion vector that represents an offset between each block of the plurality of blocks in the first image and corresponding blocks of pixels within a second image of the scene of interest, wherein computing a motion vector comprises:
      computing, for each of the plurality of blocks, at least one of horizontal projections and vertical projections for the block, wherein the horizontal projections comprise a summation of pixel values along an x-axis within each block, and the vertical projections comprise summations of pixel values along a y-axis within each block; and
      computing, for each of the plurality of blocks, a motion vector based on the at least one of the horizontal and vertical projections for the block;
   averaging pixel values for each of the pixels of the blocks of the first image with pixel values of corresponding pixels of corresponding blocks of the second image based on the motion vector of the respective block to which the pixels belong;
   storing the averaged pixel values; and
   calculating a stabilized digital image based on the stored average pixel values.

2. The method of claim 1, further comprising:
   determining, for each of the plurality of blocks, motion vectors for each of the pixels of the block using the motion vector computed for the block to which the pixel belongs and at least one other motion vector computed for one other block of the first image, and
   wherein averaging the pixel values comprises averaging the pixel values for each of the pixels of the blocks of the first image with pixel values of corresponding pixels of the second image at locations indicated by the respective motion vectors of the pixels.

3. The method of claim 2, wherein determining motion vectors for each of the pixels comprises determining motion vectors for each of the pixels using one of extrapolation and interpolation based on the motion vector computed for the block to which the pixel belongs and at least one other motion vector computed for one other block of the first image.

4. The method of claim 1, further comprising: determining, for each of the plurality of blocks, motion vectors for sub-blocks of pixels of the block using the motion vector computed for the block to which the sub-block belongs and at least one other motion vector computed for one other block of the first image, and
   wherein averaging the pixel values comprises averaging the pixel values for each of the sub-blocks of the first image with pixel values of corresponding sub-blocks of the second image at locations indicated by the respective motion vectors of the sub-blocks.

5. The method of claim 1, further comprising capturing the first image and the second image, wherein at least one of the first image and the second image is captured during an image preview.

6. The method of claim 1, wherein partitioning the first image into a plurality of blocks of pixels comprises partitioning the first image into a plurality of overlapping blocks of pixels.

7. The method of claim 1, wherein computing a motion vector further comprises determining mean squared differences between respective horizontal and vertical projections determined from corresponding blocks of the first and second images.

8. The method of claim 1, wherein the first image is partitioned with a sixth and seventh block, wherein each of the first image and the sixth and seventh blocks have a first dimension and a second dimension,
   wherein lengths of the first dimensions of the first image, and the sixth and seventh blocks are longer than the corresponding lengths of the second dimensions of the first image, and the sixth and seventh blocks, and
   wherein the sixth and seventh blocks are positioned with their first dimensions along the first image's first dimension, wherein the sum of the length of the first dimension of the sixth block and the length of the first dimension of the seventh block is substantially equivalent to the length of the first dimension of the first image.

9. The method of claim 8, wherein the first image is partitioned with an eighth and ninth block, wherein the eighth and ninth blocks each have a first dimension and a second dimension,
   wherein lengths of the first dimensions of the eighth and ninth blocks are longer than the corresponding lengths of the second dimensions of the eighth and ninth blocks,
   wherein the eighth and ninth blocks are positioned with their second dimensions along the first image's second dimension,
   wherein the sum of the length of the second dimension of the eighth block and the length of the second dimension of the ninth block is substantially equivalent to the length of the second dimension of the first image, and
   wherein the length of the first dimension of the eighth block and the length of the first dimension of the ninth block are each less than the length of the first dimension of the first image.

10. The method of claim 9, wherein the sixth, seventh, eighth and ninth blocks each overlap the fifth block.

11. A computer-program product for stabilizing digital images comprising a computer readable non transitory medium having instructions thereon, the instructions comprising:

code for partitioning a first image of a scene of interest into a plurality of blocks of pixels, wherein four non-overlapping blocks of the plurality of blocks each define a unique quadrant of the first image, wherein each unique quadrant comprises substantially one quarter of the first image, and wherein the code for partitioning the first image of the scene of interest is configured to partition the first image with a fifth block overlapping only a portion of each of the four non-overlapping blocks;

code for computing, for each of the plurality of blocks, at least one of horizontal projections and vertical projections for each block wherein the horizontal projections comprise a summation of pixel values along an x-axis within each block, and the vertical projections comprise summations of pixel values along a y-axis within each block;

code for computing, for each of the plurality of blocks, a motion vector based on the at least one of the horizontal and vertical projections for the block, wherein the motion vector represents an offset between each block of the plurality of blocks in the first image and corresponding blocks of pixels within a second image of the scene of interest;

code for averaging pixel values for each of the pixels of the blocks of the first image with pixel values of corresponding pixels of corresponding blocks of the second image based on the motion vector of the respective block to which the pixels belong;

code for storing the averaged pixel values; and code for calculating a stabilized digital image based on the stored average pixel values.

12. The computer-program product of claim 11, further comprising:

code for determining, for each of the plurality of blocks, motion vectors for each of the pixels of the block using the motion vector computed for the block to which the pixel belongs and at least one other motion vector computed for one other block of the first image, and wherein code for averaging the pixel values comprises code for averaging the pixel values for each of the pixels of the blocks of the first image with pixel values of corresponding pixels of the second image at locations indicated by the respective motion vectors of the pixels.

13. The computer-program product of claim 12, wherein code for determining motion vectors for each of the pixels comprises code for determining motion vectors for each of the pixels using one of extrapolation and interpolation based on the motion vector computed for the block to which the pixel belongs and at least one other motion vector computed for one other block of the first image.

14. The computer-program product of claim 11, further comprising:

determining, for each of the plurality of blocks, motion vectors for sub-blocks of pixels of the block using the motion vector computed for the block to which the sub-block belongs and at least one other motion vector computed for one other block of the first image, and wherein averaging the pixel values comprises averaging the pixel values for each of the sub-blocks of the first image with pixel values of corresponding sub-blocks of the second image at locations indicated by the respective motion vectors of the sub-blocks.

15. The computer-program product of claim 11, further comprising code for capturing the first image and the second image, wherein at least one of the first image and the second image is captured during an image preview.

16. The computer-program product of claim 11, wherein code for partitioning the first image comprises code for partitioning the first image into a plurality of overlapping blocks of pixels.

17. The computer program product of claim 11, wherein the code for partitioning the first image of a scene of interest is configured to partition the first image with a sixth and seventh block, wherein the first image and the sixth and seventh blocks have a first dimension and a second dimension, and wherein lengths of the first dimensions of the first image, and the sixth and seventh blocks are longer than the corresponding lengths of the second dimensions of the first image, and the sixth and seventh blocks, wherein the sixth and seventh blocks are positioned with their first dimensions along the first image's first dimension, and wherein the sum of the length of the first dimension of the sixth block and the length of the first dimension of the seventh block is substantially equivalent to the length of the first dimension of the first image.

18. The computer program product of claim 17, wherein the code for partitioning the first image of a scene of interest is configured to partition the first image of a scene of interest with an eighth and ninth block, wherein the first image and the eighth and ninth blocks each have a first dimension and a second dimension, and wherein lengths of the first dimensions of the eighth and ninth blocks are longer than the corresponding lengths of the second dimensions of the eighth and ninth blocks, and wherein the eighth and ninth blocks are positioned with their second dimensions along the first image's second dimension, wherein the sum of the length of the second dimension of the eighth block and the length of the second dimension of the ninth block is substantially equivalent to the length of the second dimension of the first image, and wherein the length of the first dimension of the eighth block and the length of the first dimension of the ninth block are each less than the length of the first dimension of the first image.

19. The computer program product of claim 18, wherein the sixth, seventh, eighth and ninth blocks each overlap the fifth block.

20. An apparatus for stabilizing digital images comprising:

an image processor to process the digital image data, the image processor including:

a block partitioner to partition a first image of a scene of interest into a plurality of blocks of pixels, wherein four non-overlapping blocks of the plurality of blocks each define a unique quadrant of the first image, wherein each unique quadrant comprises substantially one quarter of the first image, and wherein the block partitioner partitions the first image of the scene of interest with a fifth block overlapping only a portion of each of the four non-overlapping blocks;

a motion vector module that computes, for each of the plurality of blocks, at least one of horizontal projections and vertical projections for each block, wherein the horizontal projections comprise a summation of pixel values along an x-axis within each block, and the vertical projections comprise summations of pixel values along a y-axis within each block, and computes for each of the plurality of blocks, a motion vector based on the at least one of the horizontal and vertical projections for the block, wherein the motion vector represents an offset between each block of the plurality of blocks in the first image and corresponding blocks of pixels within a second image of the scene of interest; and pixel averaging module that averages pixel values for each of the pixels of the blocks of the first image with pixel values of corresponding pixels of corresponding blocks of the second image based on the motion vector of the respective block to which the pixels belong;

a memory to store the averaged pixel values; and a module that calculates a stabilized digital image based on the stored average pixel values.

21. The apparatus of claim 20, wherein:

the motion vector module determines, for each of the plurality of blocks, motion vectors for each of the pixels of the block using the motion vector computed for the block to which the pixel belongs and at least one other motion vector computed for one other block of the first image, and the pixel averaging module averages the pixel values for each of the pixels of the blocks of the first image with pixel values of corresponding pixels of the second image at locations indicated by the respective motion vectors of the pixels.

22. The apparatus of claim 21, wherein the motion vector module determines motion vectors for each of the pixels using one of extrapolation and interpolation based on the motion vector computed for the block to which the pixel belongs and at least one other motion vector computed for one other block of the first image.

23. The apparatus of claim 20, further comprising an image sensor to capture the first image and the second image, wherein the image sensor captures at least one of the first image and the second image during an image preview.

24. The apparatus of claim 20, wherein the block partitioner partitions the first image into a plurality of overlapping blocks of pixels.

25. The apparatus of claim 20, wherein the apparatus is incorporated within a wireless communication device, the wireless communication device including:

an encoding module that encodes the averaged pixel values; and a transmitter that transmits the encoded averaged pixel values.

26. The apparatus of claim 20, wherein the block partitioner partitions the first image of a scene of interest with a sixth and seventh block, wherein the first image and the sixth and seventh blocks have a first dimension and a second dimension, and wherein lengths of the first dimensions of the first image, and the sixth and seventh blocks are longer than the corresponding lengths of the second dimensions of the first image, and the sixth and seventh blocks, and wherein the sixth and seventh blocks are positioned with their first dimensions along the first image's first dimension, wherein the sum of the length of the first dimension of the sixth block and the length of the first dimension of the seventh block is substantially equivalent to the length of the first dimension of the first image.

27. The apparatus of claim 26, wherein the block partitioner partitions the first image of a scene of interest with an eighth and ninth block, wherein the first image and the eighth and ninth blocks each have a first dimension and a second dimension, and wherein lengths of the first dimensions of the eighth and ninth blocks are longer than the corresponding lengths of the second dimensions of the eighth and ninth blocks, and wherein the eighth and ninth blocks are positioned with their second dimensions along the first image's second dimension, wherein the sum of the length of the second dimension of the eighth block and the length of the second dimension of the ninth block is substantially equivalent to the length of the second dimension of the first image, and wherein the length of the first dimension of the eighth block and the length of the first dimension of the ninth block are each less than the length of the first dimension of the image.

28. The apparatus of claim 27, wherein the sixth, seventh, eighth and ninth blocks each overlap the fifth block.

29. An apparatus for stabilizing digital images, the apparatus comprising:

means for partitioning a first image of a scene of interest into a plurality of blocks of pixels, wherein four non-overlapping blocks of the plurality of blocks each define a unique quadrant of the first image, wherein each unique quadrant comprises substantially one quarter of the first image, and wherein the means for partitioning is configured to further partition the first image of the scene of interest with a fifth block overlapping only a portion of each of the four non-overlapping blocks;

means for computing, for each of the plurality of blocks, at least one of horizontal projections and vertical projections for each block, wherein the horizontal projections comprise a summation of pixel values along an x-axis within each block, and the vertical projections comprise summations of pixel values along a y-axis within each block;

means for computing, for each of the plurality of blocks, a motion vector based on the at least one of the horizontal and vertical projections for the block, wherein the motion vector represents an offset between each block of the plurality of blocks in the first image and corresponding blocks of pixels within a second image of the scene of interest;

means for averaging pixel values for each of the pixels of the blocks of the first image with pixel values of corresponding pixels of corresponding blocks of the second image based on the motion vector of the respective block to which the pixels belong;

means for storing the averaged pixel values; and means for calculating a stabilized digital image based on the stored average pixel values.

30. The apparatus of claim 29, wherein:

the determining means determines, for each of the plurality of blocks, motion vectors for each of the pixels of the block using the motion vector computed for the block to which the pixel belongs and at least one other motion vector computed for one other block of the first image, and the averaging means averages the pixel values for each of the pixels of the blocks of the first image with pixel values of corresponding pixels of the second image at locations indicated by the respective motion vectors of the pixels.

31. The apparatus of claim 30, wherein the determining means determines motion vectors for each of the pixels using one of extrapolation and interpolation based on the motion vector computed for the block to which the pixel belongs and at least one other motion vector computed for one other block of the first image.

32. The apparatus of claim 29, wherein
the determining means determines, for each of the plurality of blocks, motion vectors for sub-blocks of pixels of the block using the motion vector computed for the block to which the sub-block belongs and at least one other motion vector computed for one other block of the first image, and
the averaging means averages the pixel values for each of the sub-blocks of the first image with pixel values of corresponding sub-blocks of the second image at locations indicated by the respective motion vectors of the sub-blocks.

33. The apparatus of claim 29, wherein the means for partitioning is configured to further partition the first image of a scene of interest with a sixth and seventh block, wherein the first image and the sixth and seventh blocks have a first dimension and a second dimension, and
wherein lengths of the first dimensions of the first image, and the sixth and seventh blocks are longer than the corresponding lengths of the second dimensions of the first image, and the sixth and seventh blocks, and
wherein the sixth and seventh blocks are positioned with their first dimensions along the first image's first dimension, wherein the sum of the length of the first dimension of the sixth block and the length of the first dimension of the seventh block is substantially equivalent to the length of the first dimension of the first image.

34. The apparatus of claim 33, wherein the means for partitioning is configured to further partition the first image of a scene of interest with an eighth and ninth block, wherein the first image and the eighth and ninth blocks each have a first dimension and a second dimension, and
wherein lengths of the first dimensions of the eighth and ninth blocks are longer than the corresponding lengths of the second dimensions of the eighth and ninth blocks, and
wherein the eighth and ninth blocks are positioned with their second dimensions along the first image's second dimension, wherein the sum of the length of the second dimension of the eighth block and the length of the second dimension of the ninth block is substantially equivalent to the length of the second dimension of the first image, and
wherein the length of the first dimension of the eighth block and the length of the first dimension of the ninth block are each less than the length of the first dimension of the first image.

* * * * *